Aug. 29, 1939.  H. S. JOHNSON ET AL  2,171,178
DERAILMENT ACTUATED BRAKE APPLYING MEANS FOR PONY AND ENGINE TRUCKS
Filed Oct. 20, 1936  2 Sheets-Sheet 1
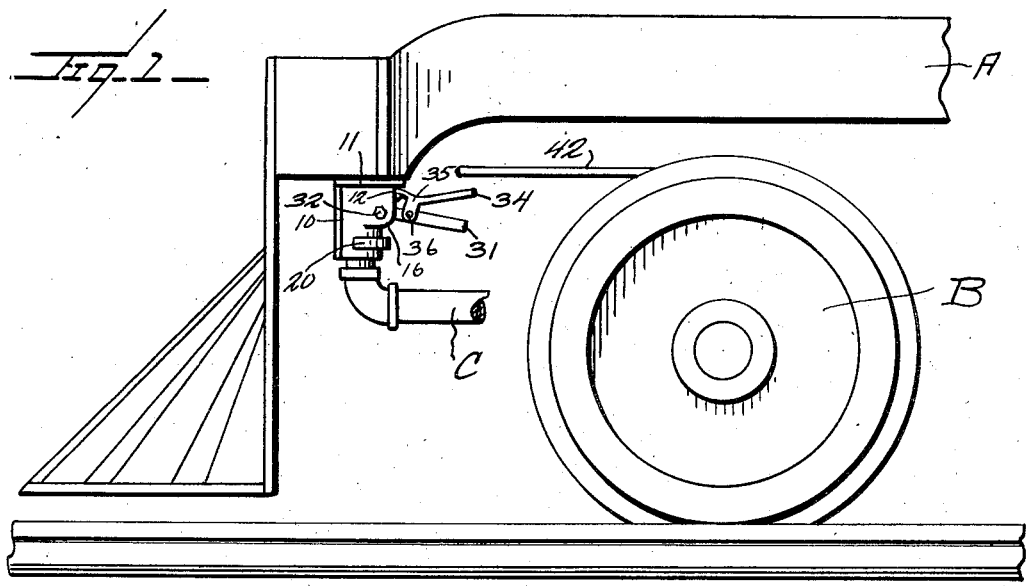
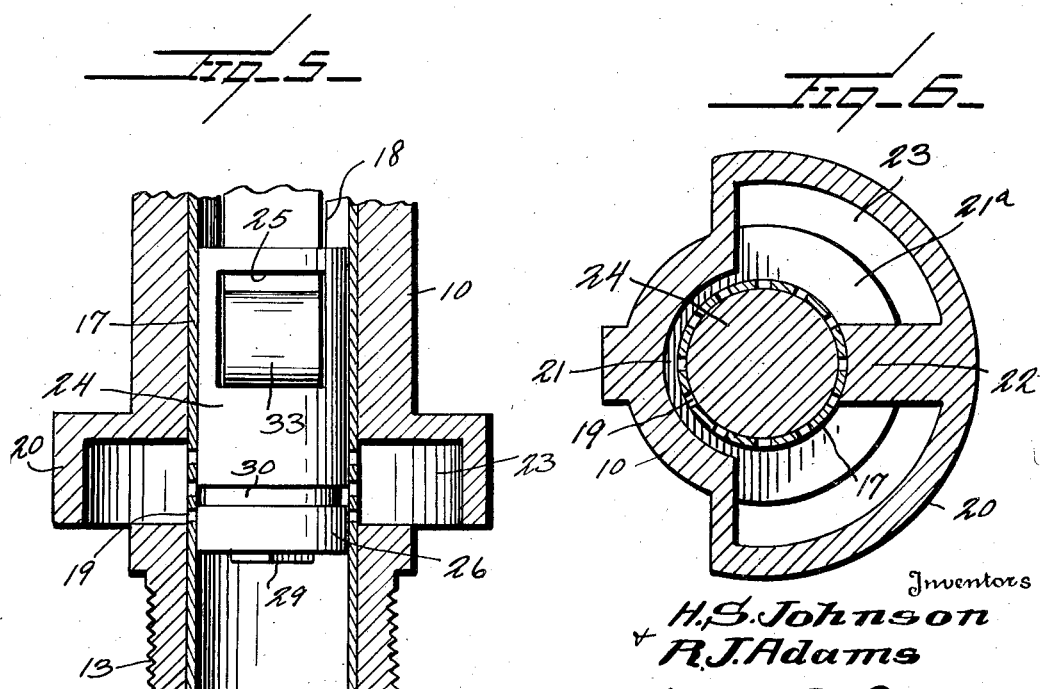
Inventors
H. S. Johnson
R. J. Adams
By Watson E. Coleman
Attorney

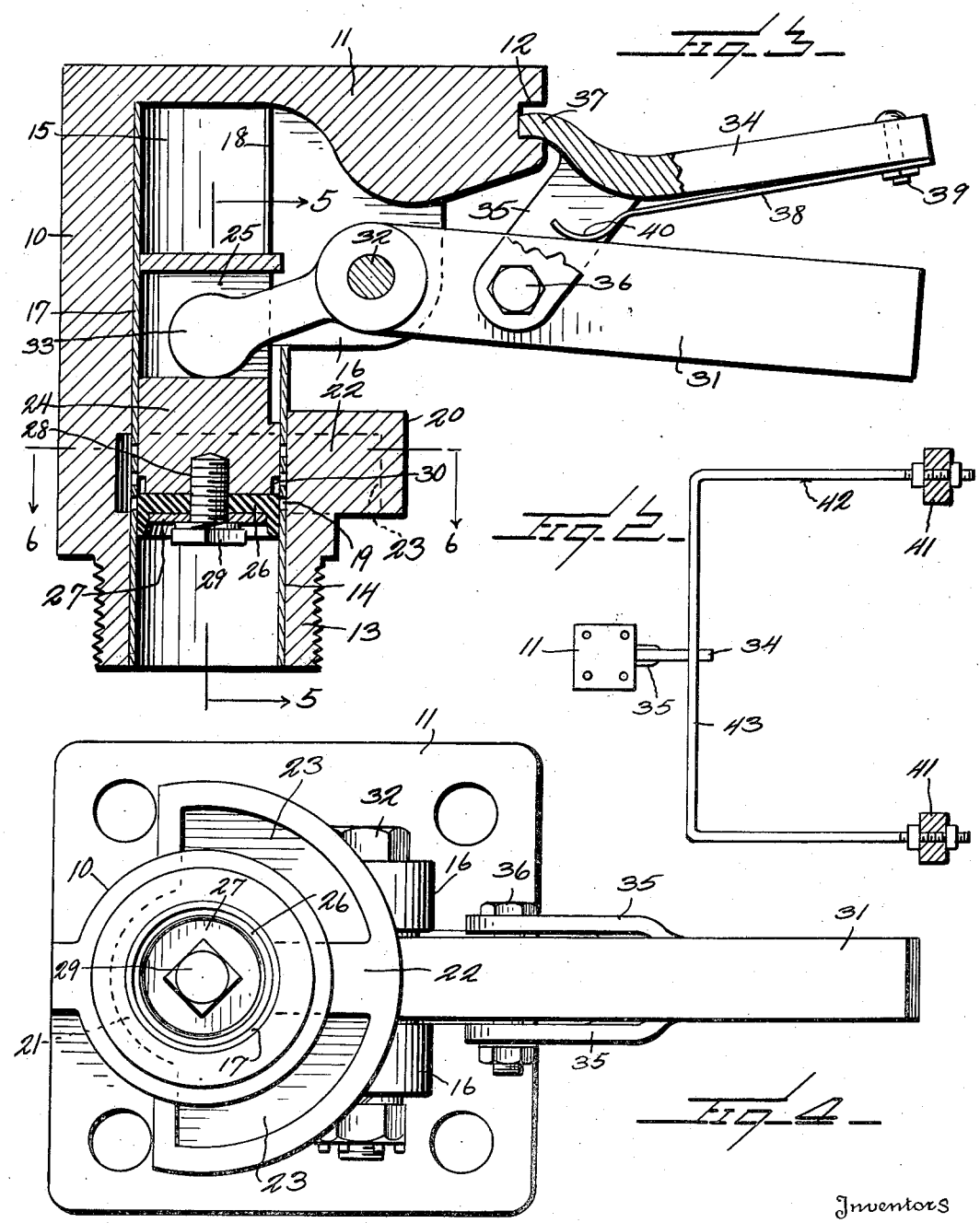

Patented Aug. 29, 1939

2,171,178

UNITED STATES PATENT OFFICE 2,171,178

DERAILMENT ACTUATED BRAKE APPLYING MEANS FOR PONY AND ENGINE TRUCKS

Harley S. Johnson, Erwin, Tenn., and Robert Joseph Adams, Ashland, Ky.

Application October 20, 1936, Serial No. 106,630

4 Claims. (Cl. 251—26)

This invention relates to automatic brake applying devices and particularly to means for positively applying the air brakes on a locomotive and on the entire train in the event that an engine truck of the locomotive becomes derailed from any cause.

It is a fact well known to those familiar with the art that the pony or engine trucks of locomotives may become derailed and this derailment will be unnoticed during the operation of the locomotive until the derailed truck encounters some obstruction where it will be moved to a position where it will itself derail the locomotive.

It is, therefore, necessary to provide means whereby the derailment of the engine truck will automatically act to secure an emergency application of the air brakes and this is the general object of our invention.

In the prior Patents #1,556,839 of October 13, 1925; #1,586,448, granted May 25, 1926, and #1,631,868, granted on June 7, 1927 and granted to Harley S. Johnson, there was shown brake applying safety devices of this general character but in actual practice, these devices have proven faulty owing to the fact that they required the use of a large number of rods, levers, links and other connections, and that the exhaust ports, whereby the train line could be vented, were exposed to the weather, allowing these ports to become clogged with snow and ice, preventing the air from escaping to the atmosphere in case of derailment and thus preventing the application of the brakes. A further difficulty with the constructions illustrated in these patents was that with the new high speed brake equipment, the exhaust ports had to be enlarged to such an extent in order to secure a full emergency application of the brakes that the cup leather washer of the valve would not pass over these ports without catching. Furthermore, in these devices, the more train line pressure carried, the more likely the device was to operate without the pony trucks derailing, thus causing a dangerous condition.

A further objection to the construction shown in Patent 1,631,868 is that the latching bolt holding the valve in its non-venting position could be forced by train line pressure if the spring projecting the bolt became weakened or the bolt and its keeper became worn, and further because it required considerable force to release the latch, if the spring projecting the latch was of sufficient strength to hold it against train line pressure.

With these difficulties in mind, a further object of this invention is to provide a mechanism of such character that it may be readily applied to any locomotive without the necessity of placing any portion of the apparatus upon the locomotive deck or walkways, which is also a violation of interstate laws.

A further object of the invention is to provide a mechanism of this character so constructed that the exhaust port is protected from the weather, thus preventing snow and ice from freezing over the port and thus assuring a full emergency application of the brakes at all times in case of derailment of the pony trucks.

Another and very important object of this invention is to provide a mechanism of this character in which the vent valve is positively locked when the train is in motion, this construction being such that the more train line pressure carried, the stronger the lock construction operates to resist any opening movement of the valve.

Another object is to provide a mechanism which will permit normal movements of an engine truck without any operation of the air valve but which, upon an abnormal movement of the truck, will cause the air valve to be fully opened, applying the brakes and maintaining them applied until the engine and train come to a standstill.

Still another object of the invention is to provide a mechanism of this character so constructed that no part of the mechanism will be damaged or broken in case of truck derailment.

Other objects will appear in the course of the following description.

In the drawings, we have shown our invention applied to a pony truck but the invention is not limited thereto.

Our invention is illustrated in the accompanying drawings wherein:

Figure 1 is a diagrammatic elevation of a portion of a locomotive and the wheels of a pony truck supporting the forward portion of the locomotive.

Figure 2 is a top plan view of the actuating arm and of the valve and showing a part of the frame of the pony truck in cross-section.

Figure 3 is a vertical sectional view through the valve casing and valve, the operating arm and the lock being shown in elevation and the latching or locking member being partly in section.

Figure 4 is an underside plan view of the structure shown in Figure 3.

Figure 5 is a fragmentary vertical section on the line 5—5 of Figure 3.

Figure 6 is a section on the line 6—6 of Figure 3.

Referring to these drawings and particularly Figure 3, 10 designates a valve casing, the upper end of which is formed by a web 11 which extends at right angles to the axis of the valve casing and is formed at its extremity with a fairly deep notch 12. The lower end of the valve body 10 is exteriorly screw-threaded, as at 13, for engagement with the forward end of the train pipe C. This valve body 10 with its flange or web 11 is intended to be attached in any suitable manner, as by bolts, etc., to the forward end of the frame A of the locomotive. This forward end of the locomotive is supported as usual by a pony truck or trucks, the wheels of which in Figure 1 are designated B. Inasmuch as the construction of pony trucks is well known, we have not attempted to illustrate the connections between the pony truck and the frame of the locomotive. Suffice it to say that the truck is so connected to the frame that the truck may swing in a horizontal plane relative to the frame and may move vertically relative to the frame.

The casing 10 at its lower end is formed with a vertically extending bore 14 opening at its upper end into a chamber 15, which chamber opens beneath the flange or web 11, as shown clearly in Figure 2. On each side of this chamber are the brackets 16. Disposed within the bore 14 and extending up to the top of the chamber 15 is a sleeve 17, this sleeve being cut away on one side at its upper end, this opening 18 coinciding with the lateral opening from the chamber 15. The lower portion of the sleeve above the lower end thereof is formed with a plurality of ports 19, the ports being arranged in a plurality of circumferential series. The casing 10 on a level with these ports 19 is laterally enlarged to form a laterally projecting portion 20 and the bore 14 is enlarged so as to form an annular chamber 21 extending around the rear portion of the sleeve and opening into the hollow enlarged portion 21a of the chamber, as shown in Figure 6. This outwardly extending portion 20 of the casing is provided with an inwardly extending strengthening web 22, as shown in Figure 6, which bears against the sleeve 17. Obviously, this web might be omitted, if desired.

It will be seen from Figures 3 and 6, that the ports 19 open into the chamber 21—21a and it will be seen from the dotted lines in Figure 3 that the chambers 21a have downwardly extending exhaust ports 23.

Operating within the sleeve 17 is a piston valve, the body of which is designated 24. This valve, of course, fits within the sleeve 14 and the upper end of the valve is formed to provide a deep recess 25 constituting a yoke for engagement with the knuckle of a lever, as will be later stated. The lower end of the valve body 24 has a central screw-threaded bore and bearing against the lower end of the valve body is a cup washer 26 of rubber, leather or any other suitable material, held in place by a metallic washer 27 in turn held in place by a screw-thread 28 having a relatively large head 29. Just above the cup washer, the valve body is reduced in diameter, as at 30.

For the purpose of lifting the valve from the lowered position shown in Figure 3 to a position where the ports 19 are unclosed by the valve, I provide a lever or handle 31 which is pivoted upon a transverse pin 32 extending into the ears 16. This lever 31 has a downwardly and forwardly projecting knuckle 33 nearly cylindrical in form, which engages in the recess 25.

It must be remembered that train line pressure in the pipe C bears against the lower end of the valve 24 and urges this valve upward. For the purpose of preventing the upward movement of the valve until or unless the pony truck leaves the rails, and then permitting the immediate movement of the valve to an exhaust position, I provide a locking bar 34, as shown in Figure 3, which has an angular extension 35 at its forward end which extends downward and forward and is pivoted by a bolt 36 to the handle or lever 31. The locking bar 34 has a portion which extends upward and forward to form a tooth 37 which normally is in engagement with the notch 12. The locking bar is urged upward by means of a spring 38 attached at its rear end to the rear end of the locking bar 34 by means of the bolt 39, the forward end of this spring being extended downward and then upward in a curve at 40 and bearing against the upper face of the lever 31 so as to urge the locking bar 34 upward and thus urge the tooth 37 into engagement with the recess 12. It will be seen that with this construction, the greater the pressure upon the underface of the valve urging the valve upward, the greater will be the pull downward on the locking tooth 37, and the more firmly this tooth will engage with the recess 12, thus positively locking the handle or lever 31 from descent and positively locking the valve 24 from any upward movement from the position shown in Figure 3 to an exhaust position.

The rounded knuckle 33 engages within the recess 25 which, as before explained, constitutes a yoke forming part of the valve body and immediately upon the release of the latch, the valve will move upward under the pressure of the air within the train line, and as soon as the valve has uncovered the ports 19, the train line pressure will be vented to the atmosphere through the chambers or passages 21—21a and the openings 23, immediately applying the brakes on the engine and entire train.

As shown in Figure 2, there is attached to elements 41 of the pony truck an actuating member 42 which, in a sense, constitutes a U-shaped arm. This actuating member is carried by the pony truck and the cross bar 43 extends out over the latching rod or bar 34. This cross-bar 43 is disposed at a distance from the upper face of the locking bar 34 so that the pony truck may have considerable vertical movement without engaging and releasing the lock of the valve. It will further be seen that as the cross-bar 43 is relatively long, the pony truck may have considerable lateral movement without carrying the cross-bar 43 out of a position where it will actuate the locking bar upon an undue fall of the pony truck relative to the frame of the locomotive.

It is well known to those familiar with the art that the pony trucks of locomotives are located at the forward end of the locomotive and that the pony truck is a separate unit carrying the excess weight ahead of the cylinders. A locomotive frame is relatively long and rigid, and since the major portion of the weight thereof lies rearward of the foremost drivers, there is no tendency of the locomotive to tip forward when the pony trucks become derailed, the driving springs catching the excess load which the pony trucks carried while they were upon the rails. Thus it is possible for a pony truck to become derailed and this derailment be unnoticed during the operation of the locomotive until the truck encounters some obstruction which will move it to a position where it will act to derail the locomotive itself.

Due to the connection of the pony truck to the locomotive frame, there is a considerable relative movement between the frame of the locomotive and the pony truck, thus, in hilly country where the grade is constantly changing, the truck and adjacent portions of the frame move toward and away from one another for a considerable distance. Thus, a device for stopping a train in event of derailment, must allow for considerable vertical play of the truck. This is provided for in our construction as obviously, the actuating member 42 may be disposed at any desired distance above the locking bar 34. A considerable variation in angle between the truck frame and the locomotive frame must also be provided for, because in turning curves, the pony truck being well in advance, is affected much earlier than the frame is by the curve. Since there is so much movement, no direct connection can be provided between the valve actuating member and the frame of the pony truck, for such a direct connection will result in the brakes being applied without the pony truck derailing.

It will be seen that our device permits all normal movements of the pony truck and that it will not be operated by such movements while at the same time it will be immediately and fully operated in the event of derailment.

It is also pointed out that as soon as the locking bar 34 is released by engagement with the actuating element 42, that the pressure of air within the train pipe will cause the upward movement of the valve to its exhaust position, and that this valve will stay in this position even though the frame of the locomotive settled down again upon or toward the pony truck.

It is to be distinctly understood that the elements 41 shown in Figure 2 may be any portion of the frame of the pony truck and that we are not restricted to any particular mounting for the member 42 provided it is mounted on the pony truck, and it is to be particularly understood that while we have illustrated and described the use of our brake applying means on a pony truck, this brake applying means might be applied to the engine truck, and this application is within the purview of our invention. The device is equally applicable to the main frame of the locomotive and to the engine truck, because the main frame of the locomotive moves downward only a slight distance when the engine truck derails, thus making the operation of our device possible. This relative movement of the engine truck and main frame under ordinary circumstances is not so great as to cause the valve to operate unless the trucks derail.

Another advantage of the downwardly opening chamber 23 disposed to surround the ports 19 of the sleeve 17 is not only that the walls of this chamber or skirt, as they may be called, act to prevent snow and ice from freezing over the ports, but it also keeps dirt and cinders out of the mechanism, thus assuring a full emergency application in case of derailment.

What is claimed is—

1. A valve of the type described, comprising a valve casing having a cylindrical body and a laterally extending flange at its upper end, the upper end of the cylindrical body having an opening to the outer air beneath said flange, the valve casing having a lateral extension below said opening formed to provide an inwardly opening chamber having downwardly opening discharge ports opening upon the outside of the casing, a sleeve disposed within the lower portion of the valve casing and having a plurality of small ports opening into said chamber, and a piston valve operating within the sleeve and having a cup attached to its lower end and fitting said sleeve.

2. A valve mechanism of the character described, including a valve casing mountable upon an engine frame, means at one end of the valve casing whereby it may be communicatively connected to a source of fluid pressure, the valve casing having a plurality of vent ports inward of the last named end, a piston valve within the valve casing normally closing said ports and constantly under said fluid pressure, the valve casing being formed with a venting chamber extending around the valve chamber and into which said ports open, the venting chamber extending laterally and having a downwardly extending discharge port, a lever mounted on the valve casing and having an inwardly extending arm engaging with the valve and having an outwardly extending arm projecting beyond the upper end of the valve casing, the upper end of the valve casing having a horizontally disposed keeper, a latch disposed above the lever, the latch intermediate of its ends having ears extending downward and toward the casing and pivoted to the lever, the latch forward of the ears having a portion having interlocking detachable engagement with said keeper, the latch outward of the ears being formed with a relatively long arm disposed above but normally in spaced relation to the outer arm of the lever, and a spring urging the outer arm of the latch upward and the latch into engagement with said notch.

3. A valve structure of the character defined, comprising a body provided with a relatively long passage therein which is open at one end and closed at the opposite end, said body at the closed end of said passage being extended laterally to provide a supporting flange by which the mounting of the body with said passage vertically disposed is facilitated, said body at the open end of the passage being formed to facilitate the attachment of a fluid pressure line to the body, the body having a side wall opening directed laterally beneath said flange, said flange having a pair of depending ears disposed at opposite sides of said lateral opening and having a keeper detent formed in the outer edge thereof, said body having a lateral enlargement between said lateral opening and the said open end thereof, the wall of the passage of said body having a chamber formed therein in the plane of said lateral enlargement, said chamber communicating with a port opening exteriorly of the passage and directed downwardly through the lateral enlargement away from said flange, a piston disposed in said passage and adapted to cover said chamber to prevent flow of fluid from the open end of the passage into the chamber, a lever having an end pivotally mounted between said ears and engaging said piston, the other end of the lever extending laterally from beneath said flange, a latch arm disposed above and extending lengthwise of said lever and pivotally attached to the lever, said latch arm and lever having free outer ends adapted to be moved relatively to one another, and a latch carried at the inner end of said latch arm and engageable in said detent, said latch being directed substantially in a parallel line with said lever whereby the tendency of said piston to move upwardly in the passage under the urge of said fluid pressure effects a direct down-pull upon the latch to maintain it engaged in the detent.

4. A valve of the type described, comprising a valve casing having a cylindrical body and a laterally extending flange at its upper end, the upper portion of the cylindrical body having an opening to the outer air beneath said flange, a pair of wing members integral with the flange and extending longitudinally of the body upon opposite sides of said opening, a pivot pin connecting said wing members, said flange at the edge remote from the body having a latch tooth detent formed therein, a lateral extension integral with the valve casing below said opening and provided with a chamber opening into the casing and having downwardly opening discharge ports communicating with the outer air and leading from said chamber, a sleeve disposed within the lower portion of the valve casing and having a plurality of small ports opening into said chamber, a piston valve operating within the sleeve and snugly fitting therein, said valve having an upper end portion provided with a laterally directed opening facing the opening of the cylindrical body, a lever oscillatably mounted upon said pivot pin and having an end extended into the opening of said piston, a latch arm pivotally coupled with said lever upon the side of said pivot pin remote from the piston, said latch arm extending longitudinally of the lever, a latch finger carried by the latch arm and having a curved end portion adapted to extend into said detent, the pivot between the latch arm and the lever being substantially directly below the detent, and resilient means interposed between the latch arm and the lever and normally urging the oscillation of the latch arm in a direction to engage the latch finger in the detent.

HARLEY S. JOHNSON.
ROBERT JOSEPH ADAMS.